April 4, 1967 N. O. ROSAEN 3,312,345
INDICATING MEANS FOR FLUID FILTERS
Filed March 28, 1966
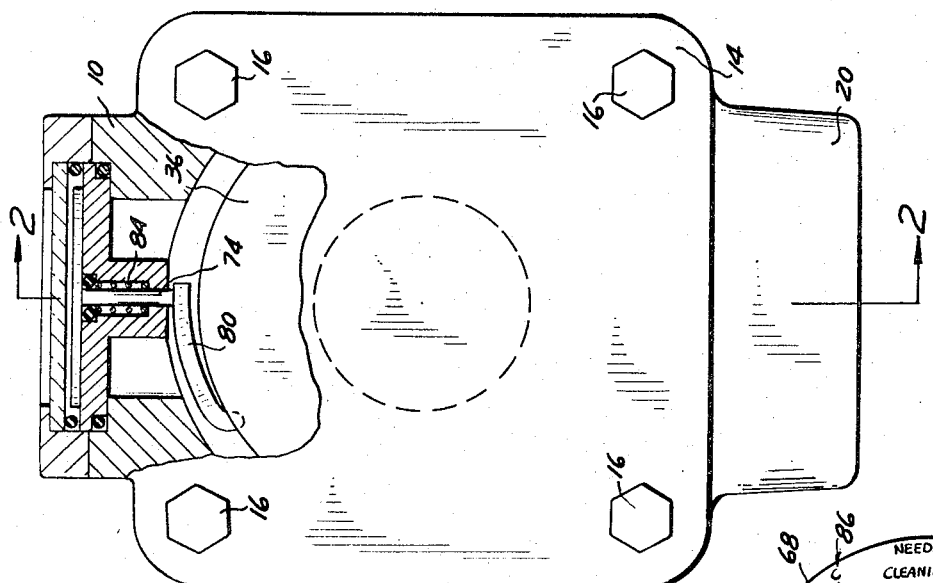
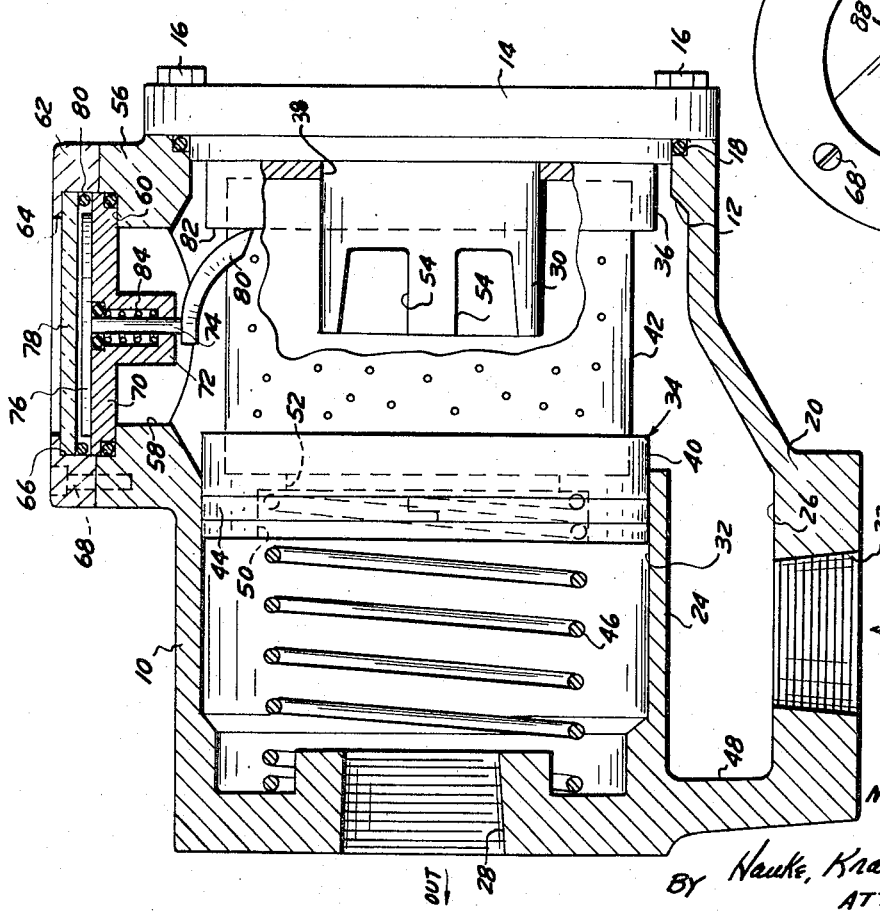
INVENTOR.
NILS O. ROSAEN
BY Hauke, Krass, & Gifford
ATTORNEYS 3,312,345
INDICATING MEANS FOR FLUID FILTERS
Nils O. Rosaen, Bloomfield Hills, Mich., assignor to The Rosaen Filter Company, Hazel Park, Mich., a corporation of Michigan
Filed Mar. 28, 1966, Ser. No. 537,925
4 Claims. (Cl. 210—90)

The present invention relates to fluid filters particularly to those provided with means for indicating the condition of the filter element and more particularly to an improved construction for such indicating means.

My U.S. Patent No. 3,113,925, issued Dec. 10, 1963, discloses and claims a filter device which includes a filter assembly movable in response to changes in the pressure differential across the filter element. Since the pressure differential will increase in direct correspondence with the increased clogging of the filter element, by providing means to indicate the axial position of tthe filter assembly and with proper indicia such indicating means will thereby indicate the condition of the filter element. By the provision of valve means responsive to movement of the filter assembly a bypass path can be opened, bypassing the filter element when the element becomes unduly clogged and the indicating means can also indicate when the bypass path is opened.

While such indicating means has proven to be highly satisfactory, it is sometimes desirable to have at least the movable portion of the indicator encased in a protective transparent cover. In this way the indicator shaft is protected from dust, dirt and the like and the pointer element is protected from interference. The present invention provides an improved construction for such indicating means.

It is an object then of the present invention to improve those filter devices with means for indicating the condition of the filter element by providing a new construction for such indicating means wherein the assembly is completely sealed from the exterior of the device.

It is another object of the present invention to improve filter condition indicating means for filter devices by providing a disc, means rotating the disc in accordance with the condition of the filter element, a transparent plate covering the disc and sealing same from the exterior of the filter device, and indicia provided adjacent the periphery of the disc and cooperating with the disc to indicate the condition of the filter element.

Other objects and advantages of the present invention will readily occur to one skilled in the art to which the invention pertains upon reference to the following description. The description refers to the accompanying drawings in which like reference characters refer to like parts throughout the several views and in which:

FIG. 1 is an end elevational view of a preferred filter device of the present invention with portions shown in section for purposes of clarity.

FIG. 2 is a longitudinal cross sectional view of the device shown in FIG. 1 with portions shown in elevation and other portions cut away for purposes of clarity, and FIG. 3 is a fragmentary elevational view as seen from the top of FIGS. 1 and 2.

Now referring to the drawings for a more detailed description of the present invention, a preferred embodiment thereof is illustrated as comprising a filter device which includes a houseing 10 having a substantially cylindrical chamber 12 closed at one end by a cap member 14. The cap member 14 is mounted to the housing 10 by screws 16 and an O-ring seal 18 is disposed intermediate the cap member 14 and the housing 10.

The housing 10 is provided with an inlet boss 20 which is provided with an inlet opening 22 and which in cooperation with an inner arcuate wall section 24 defines an inlet chamber 26 registering with the inlet opening 22 and open at one end to the chamber 12. The wall section 24 acts as a baffle for fluid entering the device through the inlet opening 22.

An outlet opening 28 is provided at the end of the housing 10 opposite the cap member 14 and opens axially to the chamber 12.

The cap member 14 is provided with a central, axially extending boss 30 which extends into the chamber 12. The boss 30 and a cylindrical guide surface 32 formed on the inner surface of the housing 10 and the wall section 14 provide the means for axially slidably mounting a filter assembly, generally indicated at 34 within the chamber 12.

The filter assembly 34 preferably comprises a first annular flanged member 36 having a central opening 38 through which the boss 30 of the cap member 14 extends, a second annular flanged member 40 axially slidably engaging the surface 32 and a cylindrical filter element 42 sandwiched between and secured to the flange members 36 and 40. A piston ring 44 is carried on the exterior surface of the flange member 40 and engaging the surface 32 so that there is no fluid leakage from the inlet opening 22 past the flange member 40 to the outlet opening 28.

The filter assembly 34 is of an axial dimension less than that of the chamber 12 and is urged against the cap member 14 by a spring 46 seated at one end in a recess 48 formed in the housing 10 around the outlet opening 28 and at the opposite end in a recess 50 formed in the flange member 40 and encompassing a central opening 52.

As the invention has thus far been described fluid is directed into the chamber 12 through the inlet opening 22 and the inlet chamber 26 and from there flows radially inwardly through the filter element 42 and then axially through the opening 52 and the outlet opening 28.

As the filter element 42 begins to become clogged, the pressure differential across the element will increase. This increased pressure differential will be present across the flange member 40 of the filter assembly 34 and when the pressure differential has increased to a value sufficient to overcome the force of the spring 46 the filter assembly 34 will begin to move axially away from the cap member 14.

As can best be seen in FIG. 2, the boss 30 is provided with a plurality of annularly spaced slots 54 extending axially from the inner end to a point spaced from the cap member 14. The slots 54 produce a bypass path opening a direct path between the inlet side of the filter element 42 to the outlet opening 28 when the filter assembly 34 has been moved a predetermined axial distance by the increased pressure differential across the element 42. Thus a bypass path is automatically opened upon the filter element 42 becoming unduly clogged and before there is a danger of the element 42 rupturing by reason of the increased pressure differential.

Because the axial movement of the filter assembly 34 is in direct correspondence to the pressure differential across the element 42 and therefore to the degree of clogging of the element 42 by providing means for indicating the position of the filter assembly 34 with proper indicia such means will function to indicate the condition of the filter element.

In the present invention such indicating means comprises a boss portion 56 formed in the housing 10 adjacent the cap member 14. The boss portion 56 is provided with an opening 58 extending radially into the chamber 12 and an exterior annular recess 60 encompassing the opening 58. A cap 62 is formed with a central opening 64 and an inner annular recess 66. The cap 62 is preferably mounted in place by screws 68 and provides the means for mounting an indicating assembly in place.

The indicating assembly preferably comprises a circular mounting member 70 having an axially inwardly extending boss 72 which provides the means for rotatably carrying a shaft 74. The exterior end of the shaft 74 is fixed to the center of an indicating disc 76 disposed exteriorly of the mounting member 70 and overlying same. A transparent disc 78 overlies the indicating disc 76. A seal 80 encompasses the indicating disc 76 and insures that the transparent disc 78 will be above and out of engagement with the indicating disc 76. The mounting member 70 and the transparent disc are of a greater diameter than the indicating disc 76 and extend into the recesses 60 and 66 so that the indicating assembly is mounted in position by the cap 62.

A generally radially extending arm 80 is fixed to the interior end of the shaft 74 in a position to be engaged by an annular shoulder 82 formed by the flange member 36 so that axial movement of the filter assembly 34 produces a corresponding rotational movement of the arm 80 and therefore the shaft 74 and the indicating disc 76. A spring 82 carried by the mounting member 70 has one end fixed to the shaft 74 to urge the arm 80 into contact with the shoulder 82.

As can best be seen in FIG. 3, the exterior surface of the cap 62 is provided with indicia 86 spaced annularly about the exposed periphery of the transparent disc 78. The indicator disc 76 which of course can be seen through the disc 78 is provided with an indicator 88 in the form of an arrow or the like which is rotated by the arm 80 and shaft 74 and cooperates with the indicia 86 to indicate the condition of the filter element 42 and when the bypass path through the slots 54 is opened.

Although the indicating means of the present invention is similar to that disclosed in my aforementioned patent, it has the advantage that the indicator disc 76 is mounted in a completely sealed and protected position. There is therefore no danger of the indicating means becoming damaged or of dust or dirt interfering with rotation of the indicating means. Since there are no exposed rotating parts, injury from such sources to the operator of the system to which the device is connected is avoided and hair or clothing cannot become entangled in the indicating means.

It is apparent that although I have described but a single embodiment of my invention, many changes and modifications can be made therein without departing from the spirit of the invention as expressed by the appended claims.

I claim:
1. A filter device having a housing, a filter element carried in said housing, means movable in response to changes in the pressure differential across said element, and means for indicating the position of said movable member exteriorly of said housing, said last mentioned means comprising
    (a) said housing being provided with an opening,
    (b) a shaft and means rotatably mounting said shaft within said opening,
    (c) an arm carried on one end of said shaft and engageable with said movable member to produce rotation of said shaft upon movement of said movable member, and
    (d) an indicator member fixed to the opposite end of said shaft to be visible through said opening, said indicator member comprising a disc having a pointer member formed thereon with said shaft being fixed to only one side of said disc,
    (e) said indicator member being rotatable with said said shaft whereby to assume a rotated position in accordance with the movement of said movable member, and
    (f) a transparent member sealing the exterior end of said opening.

2. The filter device as defined in claim 1 and including
    (a) a cover member removably secured to said housing and extending across said opening,
    (b) said cover member having a central opening and mounting said transparent member in position across said central opening.

3. The filter device as defined in claim 1 and in which said mounting means comprises,
    (a) said housing being provided with a recess encompassing said opening,
    (b) a mounting member seated in said recess,
    (c) means fixing said mounting member in place.

4. The filter device as defined in claim 2 and in which said cover member is provided with indicia formed about said central opening which cooperates with said pointer member formed on said disc to indicate the position of said movable member.

References Cited by the Examiner
UNITED STATES PATENTS

| | | | |
|---|---|---|---|
| 1,098,968 | 6/1914 | Pfahl | 73—320 |
| 3,113,925 | 12/1963 | Rosaen | 210—315 |
| 3,224,583 | 12/1965 | Rosaen | 210—90 |

REUBEN FRIEDMAN, *Primary Examiner.*

SAMIH N. ZAHARNA, *Examiner.*